United States Patent [19]

Takeshita et al.

[11] Patent Number: 4,838,121

[45] Date of Patent: Jun. 13, 1989

[54] MANUALLY OPERATED CHANGE-SPEED MECHANISM IN POWER TRANSFER DEVICE

[75] Inventors: Keiji Takeshita; Hideo Hamano; Shuichiro Ida, all of Toyota, Japan

[73] Assignee: Toyota Jidosha Kabushiki Kaisha, Japan

[21] Appl. No.: 164,410

[22] Filed: Mar. 4, 1988

[30] Foreign Application Priority Data

Mar. 10, 1987 [JP] Japan ............................ 62-34817[U]

[51] Int. Cl.⁴ ............................................. F16H 3/44
[52] U.S. Cl. ...................................................... 74/785
[58] Field of Search ........................................... 74/785

[56] References Cited

U.S. PATENT DOCUMENTS 4,440,042  4/1984  Holdeman ............................. 74/785
4,667,538  5/1987  Larsson ................................ 74/785

FOREIGN PATENT DOCUMENTS 0132023  1/1985  European Pat. Off. .............. 74/785
61-153628  9/1986  Japan .
2102515  2/1983  United Kingdom ................. 74/785

Primary Examiner—Dirk Wright
Attorney, Agent, or Firm—Oliff & Berridge

[57] ABSTRACT

A manually operated change-speed mechanism in a power transfer device includes input and output shafts arranged coaxially to each other for relative rotation, a planetary gear unit mounted on the input shaft and having an input element mounted on the input shaft for rotation therewith and an output element connectable to the output shaft, an internally splined clutch sleeve axially slidably mounted on an externally splined portion of the output shaft and shiftable between a first position in which it is engaged with the output element of the gear unit and a second position in which it is engaged with an externally splined portion of the input shaft, wherein a synchronizer assembly is arranged to effect synchronous engagement between the clutch sleeve and the externally splined portion of the input shaft in shifting operation of the clutch sleeve toward the second position.

2 Claims, 2 Drawing Sheets

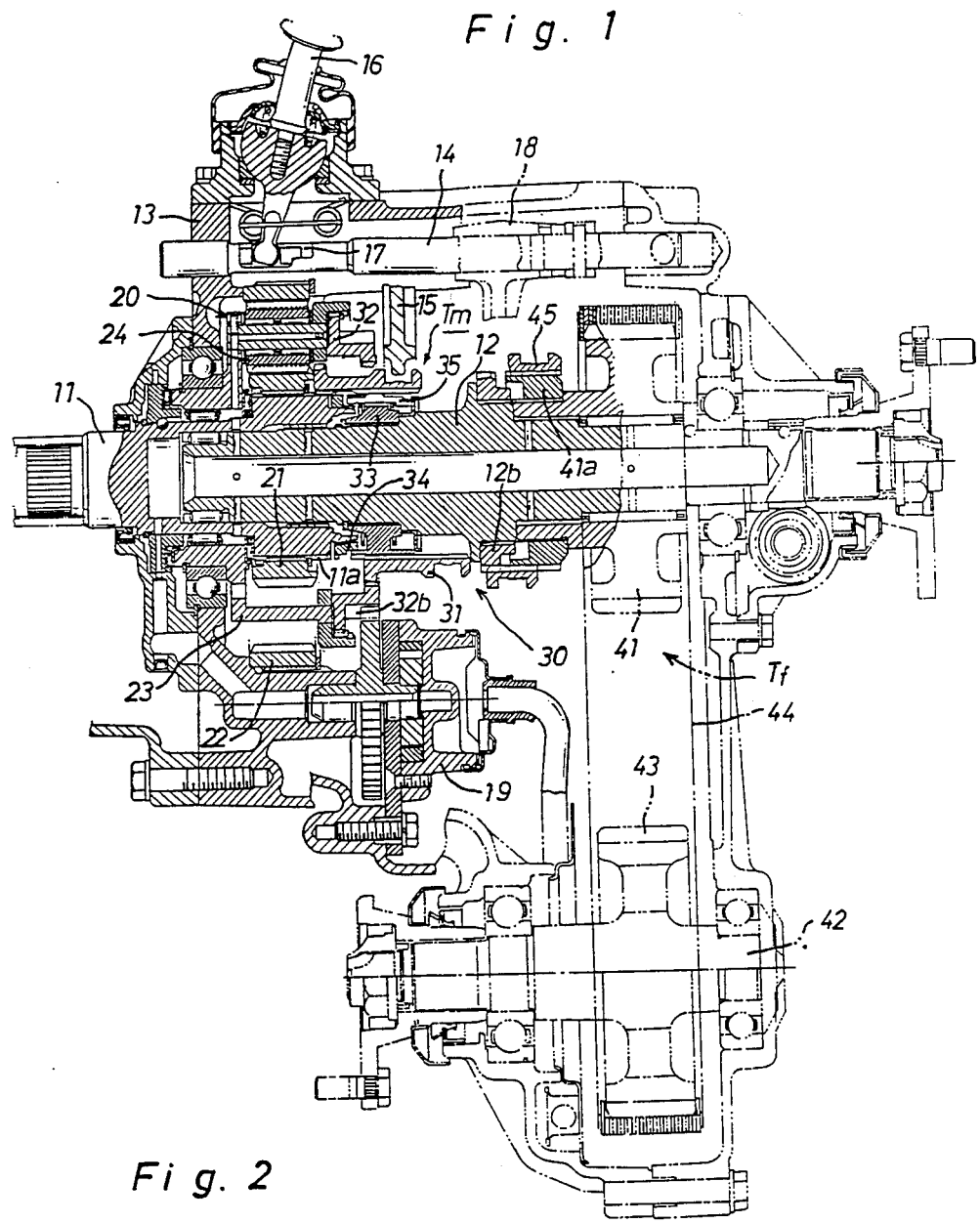
Fig. 1
Fig. 2
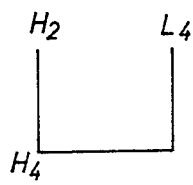

MANUALLY OPERATED CHANGE-SPEED MECHANISM IN POWER TRANSFER DEVICE

BACKGROUND OF THE INVENTION

1. Field of the Invention

The present invention relates to a power transfer device for four-wheel drive vehicles, and more particularly to a manually operated change-speed mechanism in the power transfer device.

2. Description of the Prior Art

In Japanese Utility Model Early Publication No. 61-153628, there has been proposed a manually operated ancillary change-speed mechanism in a power transfer device for four-wheel drive vehicles. The change-speed mechanism comprises input and output shafts coaxially arranged to each other for relative rotation, a planetary gear unit having an input element mounted on the input shaft for rotation therewith and an output element connectable to the output shaft, and a clutch sleeve axially slidably mounted on the output shaft for rotation therewith and shiftable between a first position in which it is engaged with the output element of the gear unit to provide a low speed drive power train between the input and output shafts and a second position in which it is engaged with the input shaft to provide a high speed drive power train between the input and output shafts. The clutch sleeve has an internal spline in continual engagement with an externally splined portion of the output shaft and engageable with an externally splined portion of the input shaft and has an external spline engageable with an internal spline of the output element of the gear unit. When positioned in the first position, the clutch sleeve is maintained in meshing engagement with the internal spline of the output element at its external spline to provide the low speed drive power train between the input and output shafts. When shifted to the second position, the clutch sleeve is brought into meshing engagement with the externally splined portion of the input shaft at its internal spline to establish the high speed drive power train between the input and output shafts.

In such a change-speed mechanism as described above, smooth meshing engagment with the externally splined portion of the input shaft may not be effected in shifting operation of the clutch sleeve to the second position from the first position. For this reason, unpleasant gear noises will occur if the clutch sleeve is shifted to the second position during acceleration or high speed travel of the vehicle. To eliminate the occurrence of such unpleasant gear noises, the clutch sleeve has to be shifted to the second position only when the vehicle is stopping or traveling at a low speed.

SUMMARY OF THE INVENTION

It is, therefor, a primary object of the present invention to provide an improved change-speed mechanism wherein the clutch sleeve can be smoothly shifted to the second position during acceleration or high speed travel of the vehicle without causing unpleasant gear noises.

According to the present invention, the object is attained by providing a manually operated change-speed mechanism wherein a synchronizer assembly is arranged to effect synchronous engagement between the clutch sleeve and the externally splined portion of the input shaft in shifting operation of the clutch sleeve toward the second position. In a preferred embodiment of the present invention, the input shaft is formed at an innermost end thereof with a conical portion, and the internally splined clutch sleeve is axially slidably mounted on an externally splined hub member fixed to the output shaft for rotation therewith. In the preferred embodiment, the synchronizer assembly comprises a synchronizer ring mounted on the conical portion of the input shaft for frictional engagement therewith, and thrust means for moving the synchronizer ring toward the externally splined portion of the input shaft in shifting operation of the clutch sleeve toward the second position to effect the frictional engagement of the synchronizer ring with the conical portion of the input shaft. The thrust means comprises a plurality of circumferentially spaced strut keys each having a raised portion in engagement with a corresponding recess in the inner peripheral wall of the clutch sleeve and an annular retainer spring arranged to bias the strut keys radially outwardly for engagement with the clutch sleeve.

BRIEF DESCRIPTION OF THE DRAWINGS

Other objects, features and advantages of the present invention will be readily appreciated as the same becomes better understood by reference to the following detailed description when considered in connection with the accompanying drawings, in which:

FIG. 1 is a full sectional view of a power transfer device;

FIG. 2 illustrates a shift pattern of a manual shift lever adapted to the transfer device.

DESCRIPTION OF THE PREFERRED EMBODIMENT

Figure 3:
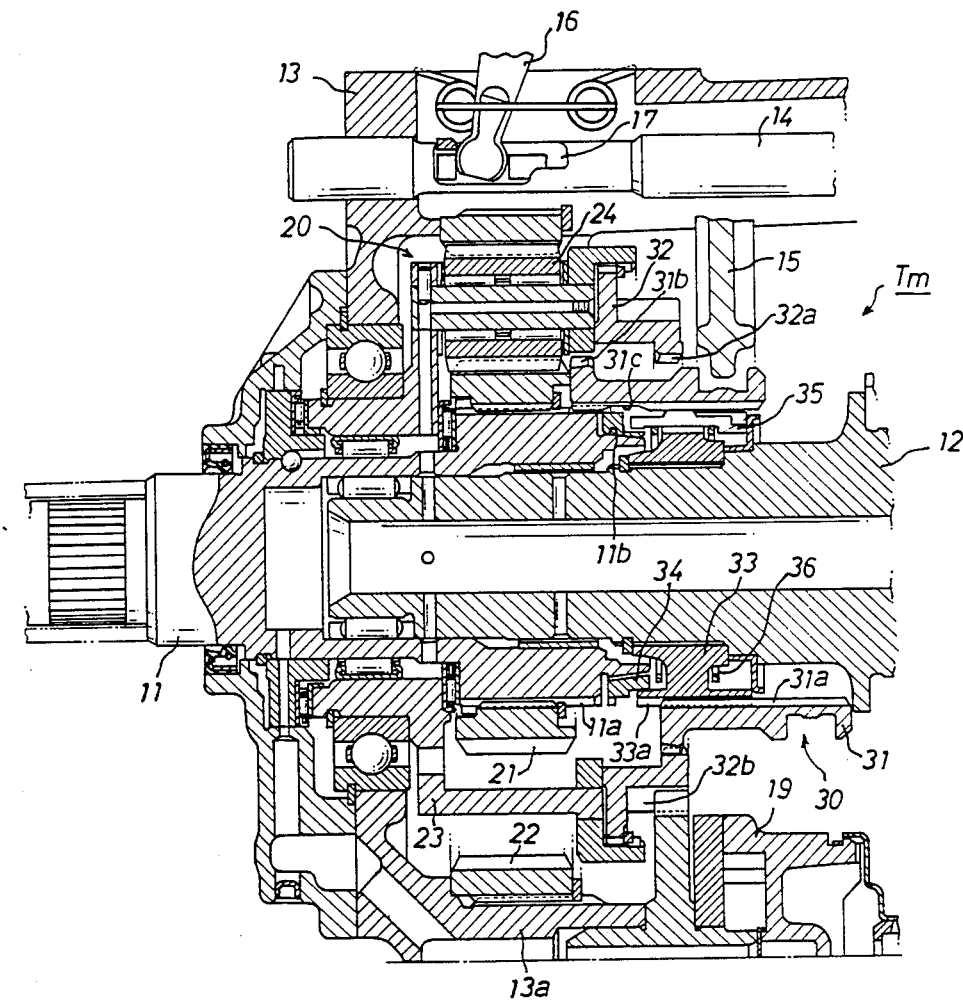
FIG. 3 is an enlarged sectional view of a manually operated change-speed mechanism in the power transfer device.

Referring now to the drawings, FIG. 1 illustrates a power transfer device for an automotive vehicle of the part-time four-wheel drive type. The power transfer device includes an input shaft 11, a first output shaft 12, a second output shaft 42, and a manually operated ancillary change-speed mechanism Tm associated with a clutch mechanism 30. The input shaft 11 is rotatably supported on a left-hand side wall of a housing 13 through a needle bearing, a carrier 23, and a ball bearing. The input shaft 11 has an internally splined portion for connection to an output shaft of a primary power transmission (not shown) of the vehicle and has an externally splined portion 11a. The first output shaft 12 is rotatably supported on a right-hand side wall of the housing 13 through a ball bearing and is arranged coaxially with the input shaft 11. The first output shaft 12 has an inner end portion coupled within a hollow inner end portion of input shaft 11 through a needle bearing for relative rotation and has an output end for drive connection to rear wheel drive axles (not shown). The second output shaft 42 is arranged in parallel with the input and output shafts 11 and 12 and is rotatably mounted within the housing 13 through a pair of axially spaced ball bearings for drive connection to front wheel drive axles (not shown).

As clearly shown in FIG. 3, the ancillary change-speed mechanism Tm includes a planetary gear unit 20 mounted on the input shaft 11. The planetary gear unit 20 comprises a sun gear 21 mounted in place on the externally spline portion 11a of input shaft 11 for rotation therewith, a stationary ring gear 22 arranged concentrically with the sun gear 21 and secured to an internal cylindrical wall 13a of housing 13, a plurality of planetary gears 24 rotatably supported by the carrier 23 and in mesh with the sun gear 21 and ring gear 22, and an internally splined side gear member 32 integrally fixed to the right end of carrier 23 for rotation therewith.

The clutch mechanism 30 includes an internally splined clutch sleeve 31 which is axially slidably mounted on a hub member 33 fixed to the first output shaft 12 for rotation therewith. The clutch sleeve 31 has an internal spline 31a in continual engagement with an external spline 33a of hub member 33 and engageable with the externally splined portion 11a of input shaft 11 through a synchronizer ring 34 and has an external spline 31b engageable with an internal spline 32l of a side gear member 32. The input shaft 11 is formed at its innermost end with a conical portion 11b on which the synchronizer ring 34 is mounted for frictional engagement therewith. The clutch sleeve 31 is provided with a plurality of circumferentially spaced strut keys 35 each having a raised portion in engagement with a corresponding recess 31c in the inner peripheral wall of clutch sleeve 31. A pair of axially spaced annular retainer springs 36 are assembled with the strut keys 35 to bias them radially outwardly for resilient engagement with the clutch sleeve 31.

When the clutch sleeve 31 is positioned in a first position as shown by a lower half in the figure, it is maintained in engagement with the internal spline 32a of side gear member 32 to drivingly connect the input shaft 11 to the first output shaft 12 through the planetary gear unit 20 so as to provide a low speed drive power train between the input and output shafts 11 and 12. When the clutch sleeve 31 is shifted to a second position as shown by an upper half in the figure, the synchronizer ring 34 is moved leftward by abutment with the strut keys 35 and is frictionally engaged with the conical portion 11b of input shaft 11 to effect synchronous engagement between the clutch sleeve 31 and the externally splined portion 11a of input shaft 11 so as to provide a high speed drive power train between the input and output shafts 11 and 12.

As shown in FIG. 1, a drive mechanism Tf is provided to selectively transfer drive torque from the first output shaft 12 to the second output shaft 42. The drive mechanism Tf includes a drive sprocket 41 rotatably mounted on the first output shaft 12 through a needle bearing, a driven sprocket 43 integrally provided on the second output shaft 42, a drive chain 44 stretched over the drive and driven sprockets 41 and 43, and an internally splined clutch sleeve 45 axially slidably mounted on an externally splined hub member 41a fixed to the drive sprocket 41 and being engageable with an externally splined piece 12b fixed to the first output shaft 12. When positioned in a first position as shown by an upper half in the figure, the clutch sleeve 45 is disengaged from the externally splined piece 12b to allow relative rotation between the drive sprocket 41 and the first output shaft 12 so as to provide a two wheel drive mode. When shifted to and positioned in a second position as shown by a lower half in the figure, the clutch sleeve 45 is engaged with the externally splined piece 12b to rotate the drive sprocket 41 with the first output shaft 12 so as to provide a four wheel drive mode.

A shift mechanism for the clutch sleeves 31 and 45 includes a pair of parallel slide rods 14 and 17 axially slidably mounted within an upper portion of housing 13, a single manual shift lever 16 mounted on the housing 13 to be shifted by the operator in the vehicle compartment, a first shift fork 15 carried by the slide rod 14 and coupled with the clutch sleeve 31, and a second shaft fork 18 carried by the slide rod 17 and coupled with the clutch sleeve 45. The manual shift lever 16 is arranged to be selectively connected to the slide rod 14 or 17 when operated in a select direction. In the power transfer device, an oil pump 19 of the trochoid type is mounted on an internal wall of housing 13 at a position adjacent the planetary gear unit 20 to be driven by engagement with external teeth 32b of the side gear member 32.

In FIG. 2 there is illustrated a shift pattern of the manual shift lever 16, wherein the character $L_4$ and $H_4$ indicate low and high speed positions for four wheel drive, respectively, and the character $H_2$ indicates a high speed position for two wheel drive. When the manual shift lever 16 is positioned in the low speed position $L_4$ for four wheel drive in the shift pattern, the first shift fork 15 is positioned to retain the clutch sleeve 31 in the first position, while the second shift fork 18 is positioned to retain the clutch sleeve 45 in the second position. Thus, the drive torque from input shaft 11 is transmitted to the first output shaft 12 through the planetary gear unit 20 and transmitted to the second output shaft 42 through the drive chain 44. When the manual shift lever 16 is shifted to and positioned in the high speed position $H_4$ for four wheel drive, the first shift fork 15 is shifted leftward to retain the clutch sleeve 31 in the second position, while the second shift fork 18 is positioned to retain the clutch sleeve 45 in the second position. Thus, the drive torque from input shaft 11 is directly transmitted to the first output shaft 12 and transmitted to the second output shaft 42 through the drive chain 44. When the manual shift lever 16 is shifted to and positioned in the high speed position $H_2$ for two wheel drive, the first shift fork 15 is positioned to retain the clutch sleeve 31 in the second position, while the second shift fork 18 is shifted rightward to retain the clutch sleeve 45 in the first position. Thus, the drive torque from input shaft 11 is directly transmitted to the first output shaft 12, while the second output shaft 42 is disconnected from the first output shaft 12.

From the above description, it will be understood that in shifting operation of the clutch sleeve 31 to the second position the synchronizer ring 34 is moved leftward by engagement with the strut keys 35 and is frictionally engaged with the conical portion 11b of input shaft 11 to effect synchronous engagement between the clutch sleeve 31 and the externally splined portion of input shaft 11. With such an arrangement of the synchronizer ring 34, the clutch sleeve 31 can be smoothly shifted to the second position during acceleration or high speed travel of the vehicle without causing unpleasant gear noises.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is, therefore, to be understood that with the scope of the appended claims, the invention may be practiced otherwise than as specifically set forth herein.

What is claimed is:

1. A manually operated change-speed mechanism in a power transfer device for automotive vehicles, comprising:
   an input shaft;
   an output shaft arranged coaxially with said input shaft for relative rotation thereto;
   a planetary gear unit mounted on said input shaft and having an input element mounted on said input shaft for rotation therewith and an output element connectable to said output shaft;
   an internally splined clutch sleeve axially slidably mounted on an externally splined portion of said output shaft and shiftable between a first portion in which it is engaged with the output element of said gear unit to provide a low speed drive power train between said input and output shafts and a second position in which it is engaged with an externally splined portion of said input shaft to provide a high speed drive power train between said input and output shafts; and
   a synchronizer assembly arranged to effect synchronous engagement between said clutch sleeve and the externally splined portion of said input shaft in shifting operation of said clutch sleeve toward the second position;
   wherein said input shaft has an innermost end in the form of a conical portion, and said clutch sleeve is axially slidably mounted on an externally splined hub member fixed to said output shaft for rotation therewith, and wherein said synchronizer assembly comprises a synchronizer ring mounted on the conical portion of said input shaft for frictional engagement therewith, and thrust means for moving said synchronizer ring toward the externally splined portion of said input shaft in shifting operation of said clutch sleeve toward the second position to effect the frictional engagement of said synchronizer ring with the conical portion of said input shaft.

2. A manually operated change-speed mechanism as claimed in claim 1, wherein said thrust means comprises a plurality of circumferentially spaced strut keys each having a raised portion in engagement with a corresponding recess in the inner peripheral wall of said clutch sleeve, and an annular retainer spring arranged to bias said strut keys radially outwardly for resilient engagement with said clutch sleeve.

* * * * *